(12) United States Patent
Lee et al.

(10) Patent No.: US 10,739,196 B2
(45) Date of Patent: Aug. 11, 2020

(54) SPECTROSCOPIC APPARATUS AND SPECTROSCOPIC METHOD USING ORTHOGONAL CODE

(71) Applicants: ELECTRONICS AND TELECOMMUNICATIONS RESEARCH INSTITUTE, Daejeon (KR); KOREA ADVANCED INSTITUTE OF SCIENCE AND TECHNOLOGY, Daejeon (KR)

(72) Inventors: Won Kyoung Lee, Daejeon (KR); Ki-Hun Jeong, Daejeon (KR)

(73) Assignees: Electronics and Telecommunications Research Institute, Daejeon (KR); Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 16/353,496

(22) Filed: Mar. 14, 2019

(65) Prior Publication Data

US 2020/0011734 A1 Jan. 9, 2020

(30) Foreign Application Priority Data

Jul. 3, 2018 (KR) .................... 10-2018-0077297
Dec. 13, 2018 (KR) .................... 10-2018-0161344

(51) Int. Cl.
*G01J 3/28* (2006.01)
*G01J 3/10* (2006.01)
*G01J 3/18* (2006.01)

(52) U.S. Cl.
CPC ........ *G01J 3/10* (2013.01); *G01J 3/18* (2013.01); *G01J 3/2803* (2013.01)

(58) Field of Classification Search
CPC ...... G01J 3/10; G01J 3/18; G01J 3/2803; G01J 3/42; G01J 2001/4238; G01J 2001/4242
See application file for complete search history.

(56) References Cited

U.S. PATENT DOCUMENTS

| 7,002,679 B2 | 2/2006 | Brady et al. |
| 8,125,641 B2 | 2/2012 | Li |
| 8,233,147 B2 | 7/2012 | Saari |
| 9,671,388 B2 | 6/2017 | Lee et al. |

(Continued)

OTHER PUBLICATIONS

Richard P. Van Duyne, "Mode-Locked Laser Raman Spectroscopy—A New Technique for the Rejection of Interfering Background Luminescence Signals", Analytical Chemistry, vol. 46, No. 2, Feb. 1974, pp. 213-222.

(Continued)

*Primary Examiner* — Tarifur R Chowdhury
*Assistant Examiner* — Jonathon Cook
(74) *Attorney, Agent, or Firm* — Rabin & Berdo, P.C.

(57) ABSTRACT

Provided is a spectroscopic apparatus including an encoder configured to output an orthogonal code, a light source configured to receive the orthogonal code and provide to a sample an optical signal encoded as a pattern corresponding to the orthogonal code, a detector configured to detect a output signal emitted from the sample, and a decoder configured to share the orthogonal code with the encoder and extract a valid signal corresponding to the sample based on a correlation between the orthogonal code and the output signal.

20 Claims, 10 Drawing Sheets

(56) References Cited

U.S. PATENT DOCUMENTS

| | | | |
|---|---|---|---|
| 2004/0033616 A1* | 2/2004 | Le | G01N 21/4795 |
| | | | 436/164 |
| 2010/0072368 A1* | 3/2010 | Boegli | G01J 3/10 |
| | | | 250/338.4 |
| 2013/0161533 A1 | 6/2013 | Shin et al. | |
| 2016/0363537 A1* | 12/2016 | Krishnamachari | G01J 3/0227 |
| 2017/0350575 A1* | 12/2017 | Hill | G02B 26/0825 |
| 2018/0080822 A1* | 3/2018 | Lau | G01S 17/89 |
| 2018/0172511 A1* | 6/2018 | Margalit | G01J 3/28 |
| 2018/0231460 A1* | 8/2018 | Yanagi | G01J 3/06 |
| 2018/0328851 A1* | 11/2018 | Lee | G01N 21/658 |

OTHER PUBLICATIONS

Jung-Woo Park, et al., "Highly Enhanced Signal-to-noise Ratio LED-PD Module using Coded Light Excitation", 2018 Annual Biophotonics Conference (ABC), Oct. 27, 2018.

\* cited by examiner

SPECTROSCOPIC APPARATUS AND SPECTROSCOPIC METHOD USING ORTHOGONAL CODE

CROSS-REFERENCE TO RELATED APPLICATIONS

This U.S. non-provisional patent application claims priority under 35 U.S.C. § 119 of Korean Patent Application Nos. 10-2018-0077297, filed on Jul. 3, 2018, and 10-2018-0161344, filed on Dec. 13, 2018, the entire contents of which are hereby incorporated by reference.

BACKGROUND

The present disclosure herein relates to a spectroscopic apparatus and a spectroscopic method, and more particularly to, a spectroscopic apparatus and a spectroscopic method using orthogonal code.

Spectroscopy technology is a technique for studying molecular structures and changes of a sample by measuring light absorption, divergence, and scattering. A spectroscope such as an infrared (IR) spectroscope or a Raman spectroscope measures and analyzes the structure of an organic matter and biochemical species mainly by measuring the absorption, scattering, and scattering intensity of sample molecules as a spectrum for frequency or wavelength.

Spectroscopy such as ultraviolet-visible (UV-VIS) spectroscopy using the Bear-Lambert law analyzes the characteristics of various samples including biochemical materials through the measurement of particle size, absorbance per wavelength, and transmission, and discriminates samples based on the unique wavelength selectivity of samples. However, in relation to the existing spectroscope and spectroscopy, there is large fluctuations in absorption or transmission signal due to various system noises including a signal intensity variation of incident light and shot noise. In addition, the system noises hinder accurate and stable measurements. In order to overcome this limitation, in relation to a spectroscope and a spectroscopy, there is a need for a technique for removing noise, improving molecular vibration, and effectively improving the sensitivity of a valid signal.

SUMMARY

The present disclosure is to provide a spectroscopic apparatus and a spectroscopic method using orthogonal code.

An embodiment of the inventive concept provides a spectroscopic apparatus including: an encoder configured to generate an orthogonal code; a light source configured to receive the orthogonal code and provide to a sample an optical signal encoded as a pattern corresponding to the orthogonal code; a detector configured to detect a output signal emitted from the sample; and a decoder configured to share the orthogonal code with the encoder and extract a valid signal from the sample based on a correlation between the orthogonal code and the output signal.

In an embodiment of the inventive concept, a spectroscopic method includes: generating a first optical signal encoded according to a first orthogonal code and a second optical signal encoded according to a second orthogonal code orthogonal to the first orthogonal code; providing the first optical signal and the second optical signal to a sample; detecting a first output signal corresponding to the first optical signal and a second output signal corresponding to the second optical signal from the sample; decoding the first and second output signals according to the first and second orthogonal codes; and obtaining a valid signal based on the decoded first and second output signals.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
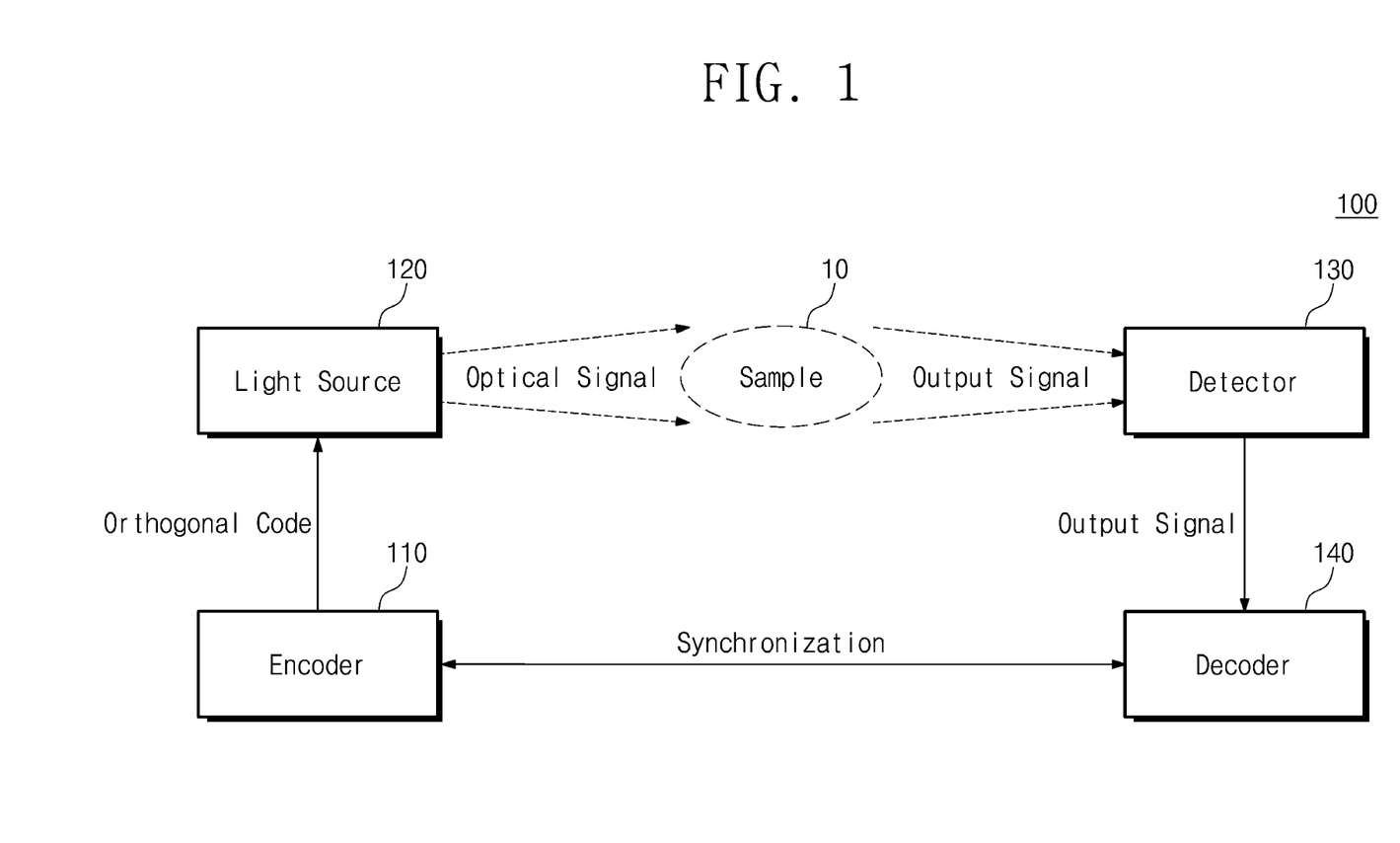
FIG. 1 is a block diagram of a spectroscopic apparatus according to an embodiment of the inventive concept.

FIG. 1 is a block diagram of a spectroscopic apparatus according to an embodiment of the inventive concept. A spectroscopic apparatus 100 may include an encoder 110, a light source 120, a sample 10, a detector 130, and a decoder 140. The spectroscopic apparatus 100 may analyze the sample 10 based on the encoded optical signal.

The encoder 110 may output an orthogonal code for encoding the optical signal of light source 120. The encoder 110 may generate an orthogonal code to modulate the optical signal of light source 120 into a pattern of an orthogonal code. The encoder 110 may operate according to a digital manner. The orthogonal code will be described later in more detail with reference to FIG. 2.

The light source 120 may provide an optical signal to a sample. The light source 120 may include at least one light source having a single wavelength or a white lamp, such as a laser and a laser diode. In addition, the light source 120 may include at least one light source having a broad spectrum, such as a red light-emitting diode (LED), a blue LED, a green LED, and a near-infrared (NIR) LED. In addition, the light source 120 may include at least one light source that is separated (e.g., 0, 45, or 90 degrees) into a polarization state having a single wavelength.

The sample 10 may be an analysis target of the spectroscopic apparatus 100. The sample 10 may be a matter or a material for analysis. For example, the sample 10 may be an organic matter. The sample 10 may absorb all or part of the optical signal provided from the light source 120. Further, the sample 10 may transmit or reflect all or part of the optical signal. Here, all or part of the optical signal may be referred to as all or part of a wavelength, all or part of a frequency, and all or part of a pattern. The sample 10 received the optical signal may emit light in response to the optical signal. Here, the light may be referred to as a output signal. The sample 10 may generate a output signal according to the internal molecular vibrations stimulated by the optical signal provided from the light source 120.

The detector 130 may detect or receive a output signal from the sample 10. The detector 130 may separate a output signal by each wavelength range to perform detection. The detector 130 may measure the spectrum for the frequency or wavelength of the output signal. The detector 130 may be a point meter or a spectroscope.

Although not shown in FIG. 1, the spectroscopic apparatus 100 may include an optical element between the sample 10 and the detector 130. The optical element may include a diffraction element for diffracting the output signal and a dispersing element for dispersing the output signal. The optical element may effectively collect the output signal from the sample 10 to the detector 130 by dispersing or diffracting the output signal.

The decoder 140 may receive the output signal from the detector 130. The decoder 140 may extract or obtain a valid signal from the output signal. The decoder 140 may analyze the sample 10 based on the valid signal. From the analysis of the sample 10, the spectroscopic apparatus 100 may determine the chemical composition of the sample 10. For example, the spectroscopic apparatus 100 may determine various characteristics of the sample 10, such as the molecular structures, molecular changes, molecular weights, and the like of the sample 10. A spectroscopic apparatus 100 using a valid signal based on orthogonal codes may increase the intensity and sensitivity of signals for molecules of the sample 10, such as food and organic molecules. The spectroscopic apparatus 100 may improve the performance of the sensing and imaging techniques for the sample 10.

The decoder 140 may match the timing with the encoder 110 by clock synchronization. The decoder 140 may synchronize the orthogonal code from the encoder 110. The encoder 110 may transmit data and signals to the decoder 140 and the decoder 140 may receive data and signals from the encoder 110. Data and signals may include information on orthogonal codes. The decoder 140 may share an orthogonal code with the encoder 110.

In an embodiment, the light source 120 may receive an orthogonal code from the encoder 110. The light source 120 may be modulated according to the orthogonal code received from the encoder 110. Methods for modulating the light source 120 with orthogonal codes may include all of optical modulation methods, electrical modulation methods, and mechanical modulation methods. Elements for each modulation method will be described in detail with reference to FIGS. 3 to 5.

Figure 2:
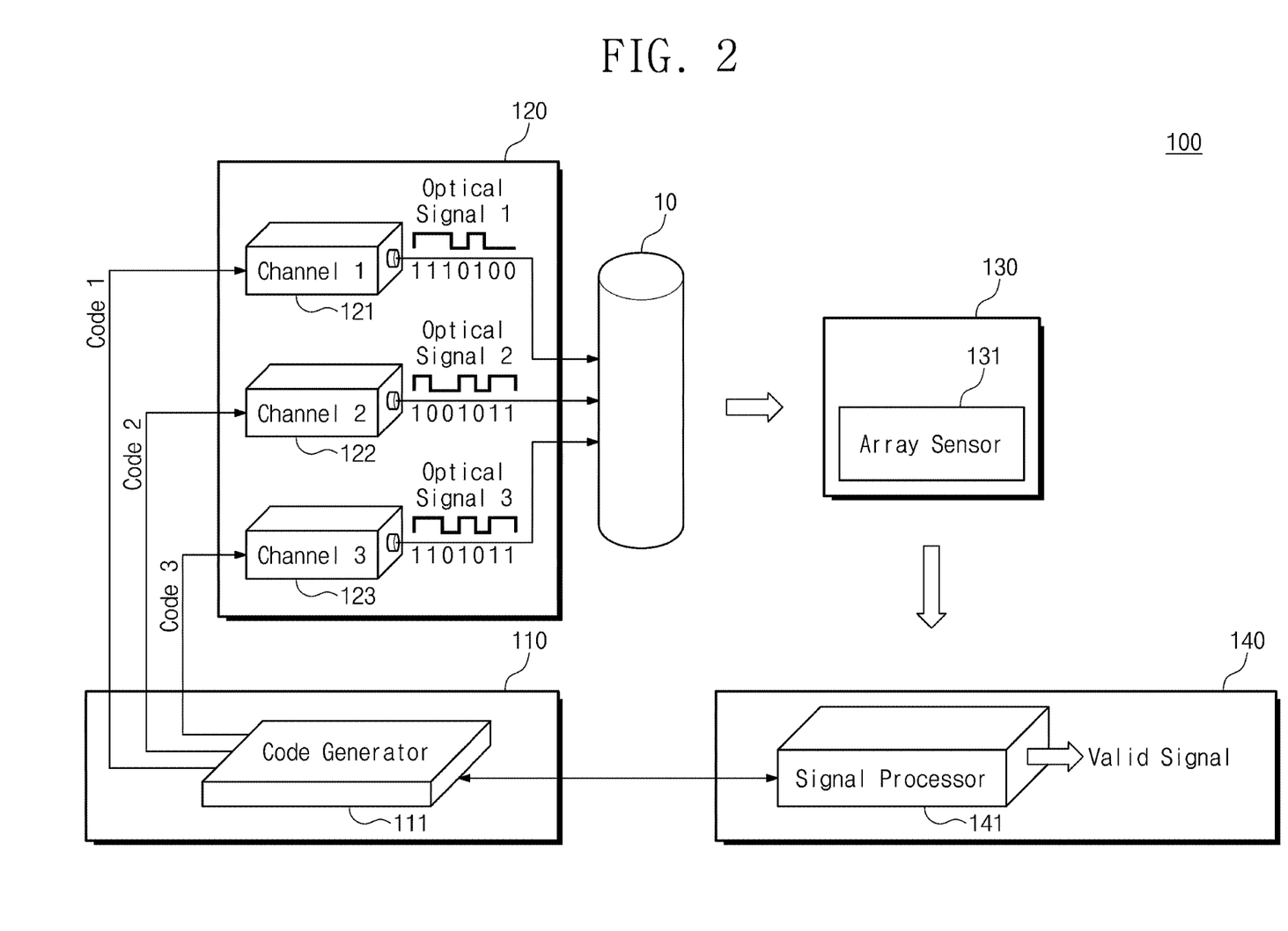
FIG. 2 is a conceptual diagram showing the spectroscopic apparatus of FIG. 1 in more detail.

FIG. 2 is a conceptual diagram showing the spectroscopic apparatus of FIG. 1 in more detail. FIG. 2 will be described with reference to FIG. 1. The encoder 110 may include a code generator 111. The light source 120 may include first to third channels 121 to 123. The detector 130 may include an array sensor 131. The decoder 140 may include a signal processor 141.

The code generator 111 may generate an orthogonal code for encoding the optical signal. The orthogonal code may be a code based on orthogonality. Specifically, a plurality of different orthogonal codes may be orthogonal to each other. That is, the cross-correlation values between a plurality of different orthogonal codes may be 0. For example, the orthogonal code may be a pseudo-noise (PN) code or a gold code. The orthogonal code may be a binary sequence. The code generator 111 may generate a plurality of orthogonal codes. The code generator 111 may separate and output a plurality of orthogonal codes. The code generator 111 may simultaneously output a plurality of orthogonal codes.

A first channel 121 may output an optical signal toward the sample 10. Before outputting the optical signal, the first channel 121 may determine the wavelength of the optical signal. The first channel 121 may output an optical signal having a determined wavelength. The wavelengths of the optical signals output by the first to third channels 121 to 123 may be different from each other.

In an embodiment, the first channel 121 may receive the first orthogonal code generated by the code generator 111 and may generate the first optical signal based on the first orthogonal code. The first orthogonal code may be modulated into the first optical signal through the first channel 121. The first channel 121 may encode the first optical signal as a pattern corresponding to the first orthogonal code. The first channel 121 may encode the pulse waveform of the first optical signal as a pattern corresponding to the binary sequence of the first orthogonal code. The first channel 121 may encode the pulse waveform of the first optical signal by line encoding according to the first orthogonal code. Referring to FIG. 2, for example, if the first orthogonal code is a binary sequence of 1110100, the magnitude of the pulse waveform of the first optical signal may correspond to the bit values of the first orthogonal code sequentially. The second and third channels 122 and 123 may be implemented by the same principle as the first channel 121. And, like the first channel 121, the second and third channels 122 and 123 may encode the second and third optical signals by the same principle as the first channel based on the second orthogonal code (e.g., 1001011) and the second orthogonal code (e.g., 1101011). That is, the second and third orthogonal codes may be modulated into the second and third optical signals through the second and third channels 122 and 123, respectively. Although only the first to third channels 121 to 123 are shown in FIG. 2, the number of channels included in the light source 120 is not limited to three.

The array sensor 131 may detect or receive a output signal from the sample 10. The array sensor 131 may detect a plurality of output signals. Here, each of the plurality of output signals may correspond to the first to third channels 121 to 123. The array sensor 131 may include a plurality of pixels and the plurality of pixels may correspond to a plurality of output signals, respectively. The array sensor 131 may simultaneously or sequentially receive a plurality of output signals.

The signal processor 141 may receive the output signal from the detector 130 and extract the valid signal from the output signal. The signal processor 141 may receive a plurality of output signals and obtain a valid signal based on correlation between the plurality of output signals and the orthogonal codes.

The signal processor 141 may synchronize the code generator 111 with a plurality of orthogonal codes. The signal processor 141 may receive data and signals including information on orthogonal codes from the code generator 111. The signal processor 141 may share an orthogonal code with the code generator 111. The signal processor 141 may receive a plurality of output signals corresponding respectively to the plurality of orthogonal codes from the array sensor 131 and extract a valid signal from the plurality of output signals based on the plurality of orthogonal codes. In an embodiment, the signal processor 141 may receive a output signal corresponding to a first orthogonal code from among a plurality of orthogonal codes. The signal processor 141 may obtain the calculation result based on the correlation between the first orthogonal code and the output signal corresponding to the first orthogonal code. Repeatedly, the signal processor 141 may obtain a plurality of calculation results based on the correlation from a plurality of orthogonal codes and a plurality of output signals. The signal processor 141 may obtain a valid signal by summing a plurality of calculation results.

Figure 3:
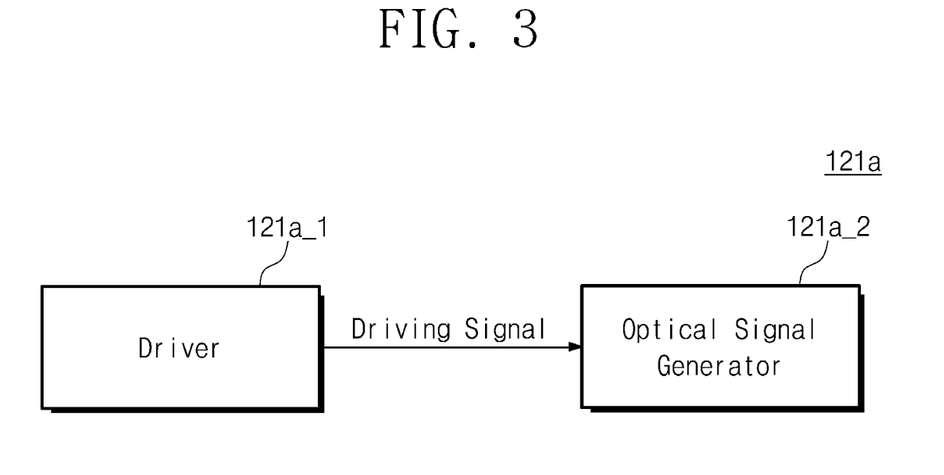
FIG. 3 is a block diagram that more specifically illustrates channels included in the light source of FIG. 2 according to an embodiment of the inventive concept.

FIG. 3 is a block diagram that more specifically illustrates channels included in the light source 120 of FIG. 2 according to an embodiment of the inventive concept. A channel 121*a* may include a driver 121*a*_1 and an optical signal generator 121*a*_2. The channel 121*a* may be substantially the same as the first to third channels 121-123 of FIG. 2. FIG. 3 will be described with reference to FIG. 2.

The driver 121*a*_1 may be a device for generating an optical signal by an electrical modulation method. The driver 121*a*_1 may generate a driving signal based on the orthogonal code received from the code generator 111 by the channel 121*a*. The driving signal may include information on orthogonal codes. The driving signal may be an electrical control signal.

The optical signal generator 121*a*_2 may generate an optical signal provided to the sample 10. The optical signal generator 121*a*_2 may generate an optical signal with an encoding process. The optical signal generator 121*a*_2 may be implemented by various devices including an LED, a laser diode, and the like.

The driver 121*a*_1 may transmit the driving signal to the optical signal generator 121*a*_2 and the optical signal generator 121*a*_2 may receive the driving signal. The optical signal generator 121*a*_2 may be controlled by a driving signal. The optical signal generator 121*a*_2 may generate an optical signal encoded as a pattern corresponding to the orthogonal code based on a driving signal including the orthogonal code.

Figure 4:
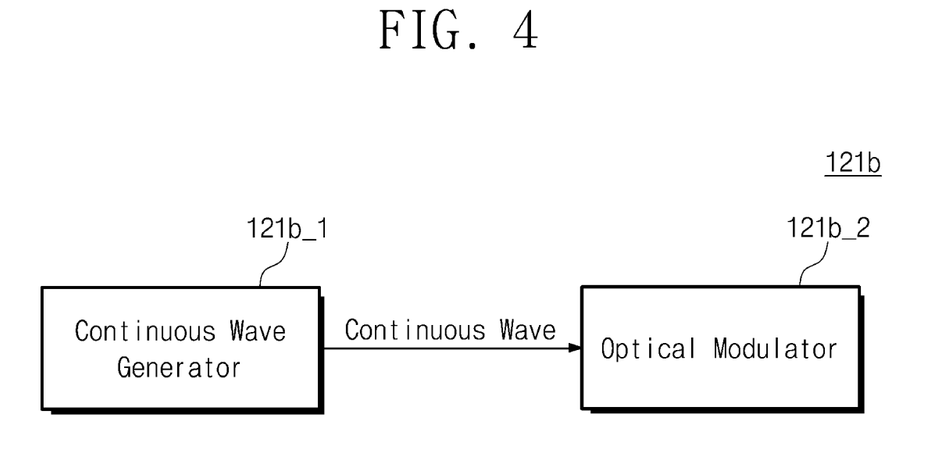
FIG. 4 is a block diagram that more specifically illustrates channels included in the light source of FIG. 2 according to another embodiment of the inventive concept.

FIG. 4 is a block diagram that more specifically illustrates channels included in the light source 120 of FIG. 2 according to another embodiment of the inventive concept. The channel 121*b* may include a continuous wave generator 121*b*_1 and an optical modulator 121*b*_2. The channel 121*b* may be substantially the same as the first to third channels 121-123 of FIG. 2. FIG. 4 will be described with reference to FIG. 2.

The continuous wave generator 121*b*_1 may output light of a continuous waveform. Here, the continuous waveform may be various waveforms including sinusoidal waves and square waves. Before outputting the continuous wave, the continuous wave generator 121*b*_1 may determine the wavelength, phase, and amplitude of the continuous wave.

The optical modulator 121*b*_2 may be a device for generating an optical signal by an optical modulation method. The optical modulator 121*b*_2 may be operated according to an operating voltage. The operating voltage of the optical modulator 121*b*_2 may be adjusted according to the orthogonal code received from the code generator 111 by the channel 121*b*. The optical modulator 121*b*_2 may modulate the phase and amplitude of light according to the operating voltage.

The continuous wave generator 121*b*_1 may output a continuous wave toward the optical modulator 121*b*_2. The continuous wave generator 121*b*_1 may provide a continuous wave to the optical modulator 121*b*_2 and the optical modulator 121*b*_2 may modulate the amplitude and phase of the continuous wave. The optical modulator 121*b*_2 may modulate the amplitude and phase of the continuous wave based on the orthogonal code received from the code generator 111 by the channel 121*b*. The optical modulator 121*b*_2 may generate the optical signal encoded as the pattern corresponding to the orthogonal code by modulating the amplitude and phase of the continuous wave according to the orthogonal code. The operating voltage of the optical modulator 121*b*_2 may be adjusted by an orthogonal code. The optical modulator 121*b*_2 may modulate the continuous wave with the optical signal encoded as the pattern corresponding to the orthogonal code based on the adjusted operating voltage.

Figure 5:
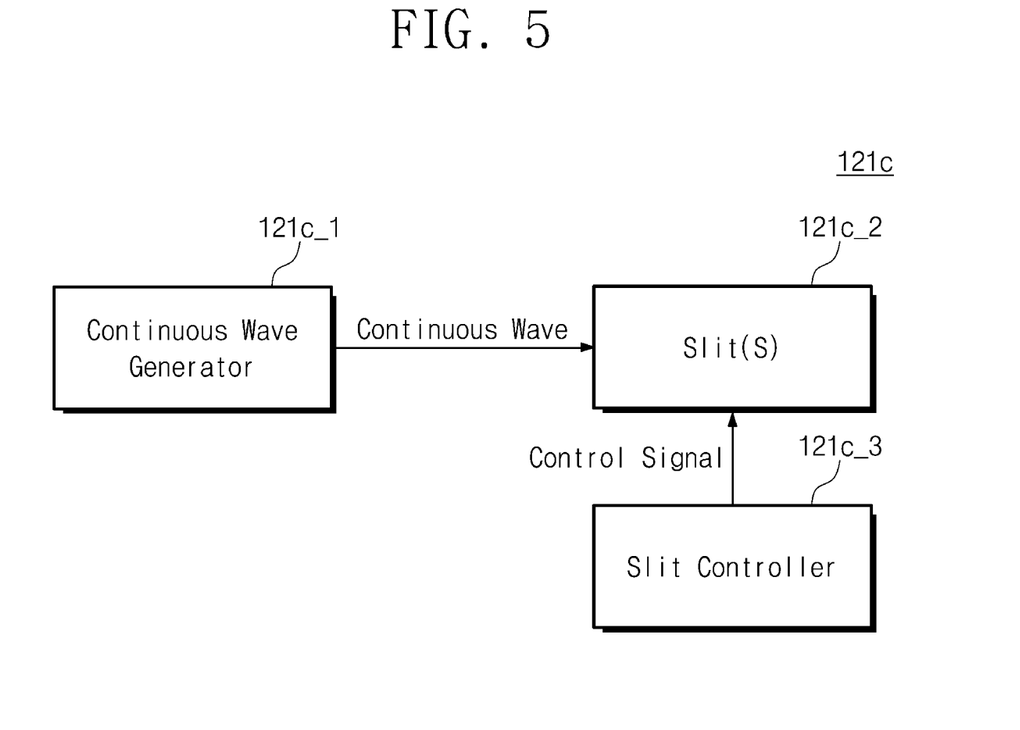
FIG. 5 is a block diagram that more specifically illustrates channels included in the light source of FIG. 2 according to another embodiment of the inventive concept.

FIG. 5 is a block diagram that more specifically illustrates channels included in the light source 120 of FIG. 2 according to another embodiment of the inventive concept. The channel 121*c* may include a continuous wave generator 121*c*_1, at least one slit 121*c*_2, and a slit controller 121*c*_3. The channel 121*c* may be substantially the same as the first to third channels 121-123 of FIG. 2. FIG. 5 will be described with reference to FIGS. 2 and 4.

The continuous wave generator 121*c*_1 may be substantially the same as the continuous wave generator 121*b*_1 of FIG. 4. Therefore, a detailed description of the continuous wave generator 121*c*_1 in FIG. 5 is omitted.

At least one slit 121*c*_2 may transmit a continuous wave output from the continuous wave generator 121*c*_1. At least one slit 121*c*_2 may adjust the transmittance of the continuous wave. At least one slit 121*c*_2 may diffract the transmitted continuous wave.

The slit controller 121*c*_3 may generate a control signal for controlling at least one slit 121*c*_2. The control signal of the slit controller 121*c*_3 may be generated based on the orthogonal code received from the code generator 111 by the channel 121*c*. The slit controller 121*c*_3 may transmit a control signal to at least one slit 121*c*_2.

In an embodiment, the slit controller 121*c*_3 may transmit a control signal to at least one slit 121*c*_2 and at least one slit 42 may receive a control signal. The slit controller 121*c*_3 may control the opening and closing operations of at least one slit 121*c*_2 by a control signal. The slit controller 121*c*_3 may adjust the opening and closing operations of at least one slit 121*c*_2 to be the same as the pattern corresponding to the orthogonal code. At least one slit 121*c*_2 may modulate the continuous wave with the optical signal encoded as the pattern corresponding to the orthogonal code based on the opening/closing operation in response to the control signal.

Figure 6:
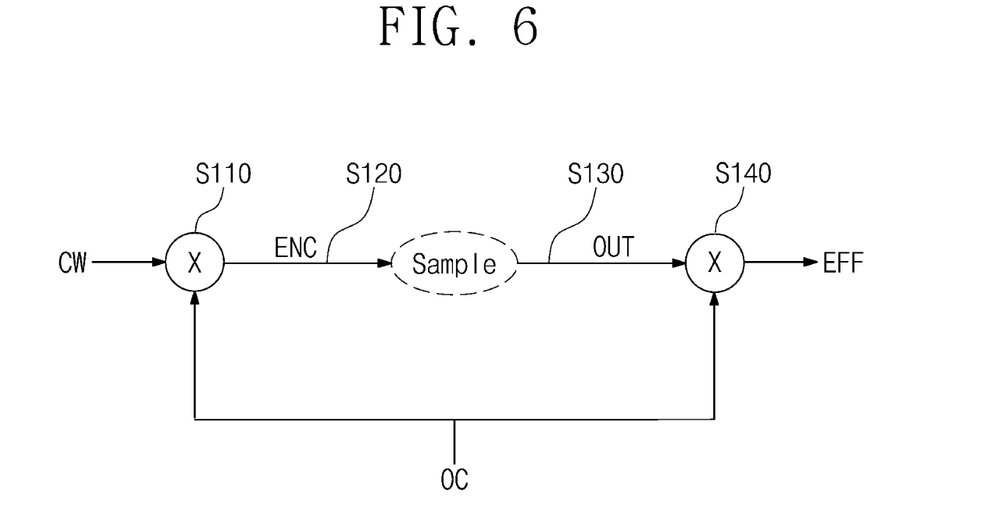
FIG. 6 is a flowchart illustrating a spectroscopic method according to an embodiment of the inventive concept.

FIG. 6 is a flowchart illustrating a spectroscopic method according to an embodiment of the inventive concept. FIG. 6 will be described with reference to FIG. 1.

In operation S110, the light source 120 may generate an optical signal ENC encoded as a pattern corresponding to the orthogonal code OC based on the orthogonal code OC and the continuous wave signal CW. The light source 120 may perform the convolution of the orthogonal code OC and the continuous wave signal CW. The light source 120 may generate the optical signal ENC based on the result of the convolution.

In operation S120, the light source 120 may provide the optical signal ENC to the sample 10. In operation S130, the detector 130 may detect the output signal OUT from the sample 10. All or part of the optical signal ENC may be absorbed, transmitted, scattered, and reflected in the sample 10. The output signal OUT may be the result of an absorbed, transmitted, scattered, and reflected optical signal ENC in the sample 10. Further, the output signal OUT may be a deformation of the optical signal ENC. The output signal OUT may include a valid signal EFF for analysis of the sample 10 and noise. The output signal OUT itself may not be useful for analyzing the sample 10. For example, the output signal OUT itself may not determine the chemical composition (e.g., molecular structure, molecular changes, molecular weight, and the like) of the sample 10.

In operation S140, the decoder 140 may extract a valid signal EFF from the output signal OUT. The decoder 140 may decode the output signal OUT. The decoder 140 may perform a convolution of the output signal OUT with the orthogonal code OC received from the encoder 110. The decoder 140 may obtain a valid signal EFF based on the result of the convolution. The valid signal EFF may have a high accuracy for analysis of the sample 10. The spectroscopic apparatus 100 may determine the chemical composition (e.g., molecular structure, molecular changes, and molecular weight, and the like) of the sample 10 based on the valid signal EFF.

Figure 7:
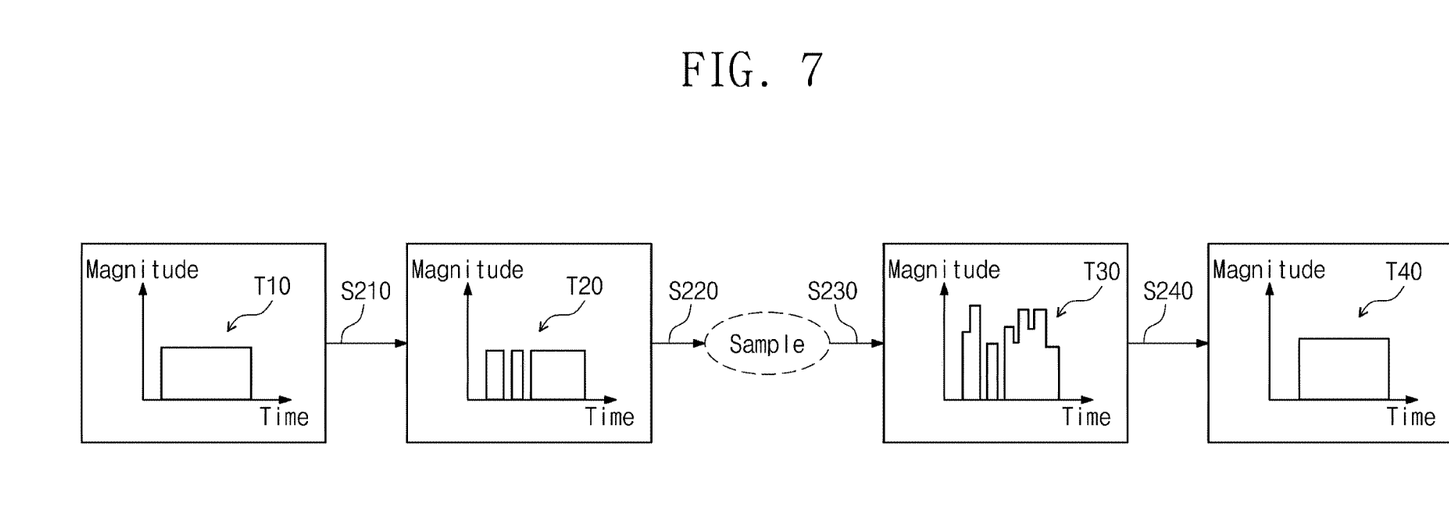
FIG. 7 is a flowchart showing the spectroscopic method of FIG. 6 in more detail in a time domain.

FIG. 7 is a flowchart showing the spectroscopic method of FIG. 6 in more detail in a time domain. FIG. 7 will be described with reference to FIGS. 1 and 6. Operation S210 may correspond to operation S110 of FIG. 6. Operation S220 may correspond to operation S120 of FIG. 6. Operation S230 may correspond to operation S130 of FIG. 6. Operation S240 may correspond to operation S140 of FIG. 6. Referring to FIG. 7, the continuous wave signal T10, the optical signal T20, the output signal T30, and the valid signal T40 may be expressed as a magnitude graph according to time.

In operation S210, the light source 120 may encode the continuous wave signal T10 into the optical signal T20. The continuous wave signal T10 may correspond to the continuous wave signal CW of FIG. 6, and the optical signal T20 may correspond to the optical signal ENC of FIG. 6. The encoder 110 may match the timing with the light source 120 by clock synchronization. The encoder 110 may provide an orthogonal code OC to the light source 120 based on the timing.

The light source 120 may generate the optical signal T20 encoded as the pattern corresponding to the orthogonal code OC from the continuous wave signal T10 based on the timing synchronized with the encoder 110. The light source 120 may perform the convolution of the orthogonal code OC and the continuous wave signal T10 based on the timing synchronized with the encoder 110. The light source 120 may generate the optical signal T20 based on the result of the convolution.

In operation S220, the light source 120 may provide the optical signal T20 to the sample 10. In operation S230, the detector 130 may detect the output signal T30 from the sample 10. The output signal T30 may correspond to the output signal OUT of FIG. 6. The optical signal T20 in the sample 10 may cause molecular vibration of the sample 10 as time elapses. A output signal T30 of absorption, scattering, transmission, and reflection may be emitted from the sample 10 based on the molecular vibration of the sample 10.

In operation S240, the decoder 140 may extract the valid signal T40 from the output signal T30. The valid signal T40 may correspond to the valid signal EFF of FIG. 6. The decoder 140 may match the timing with the encoder 110 by clock synchronization. The decoder 140 may receive an orthogonal code OC from the encoder 110 based on the timing. The decoder 140 may perform a convolution of the orthogonal code OC and the output signal T30 based on the timing synchronized with the encoder 110. The decoder 140 may obtain a valid signal T40 based on the result of the convolution. The signal-to-noise ratio (SNR) of the valid signal T40 may be improved.

Figure 8:
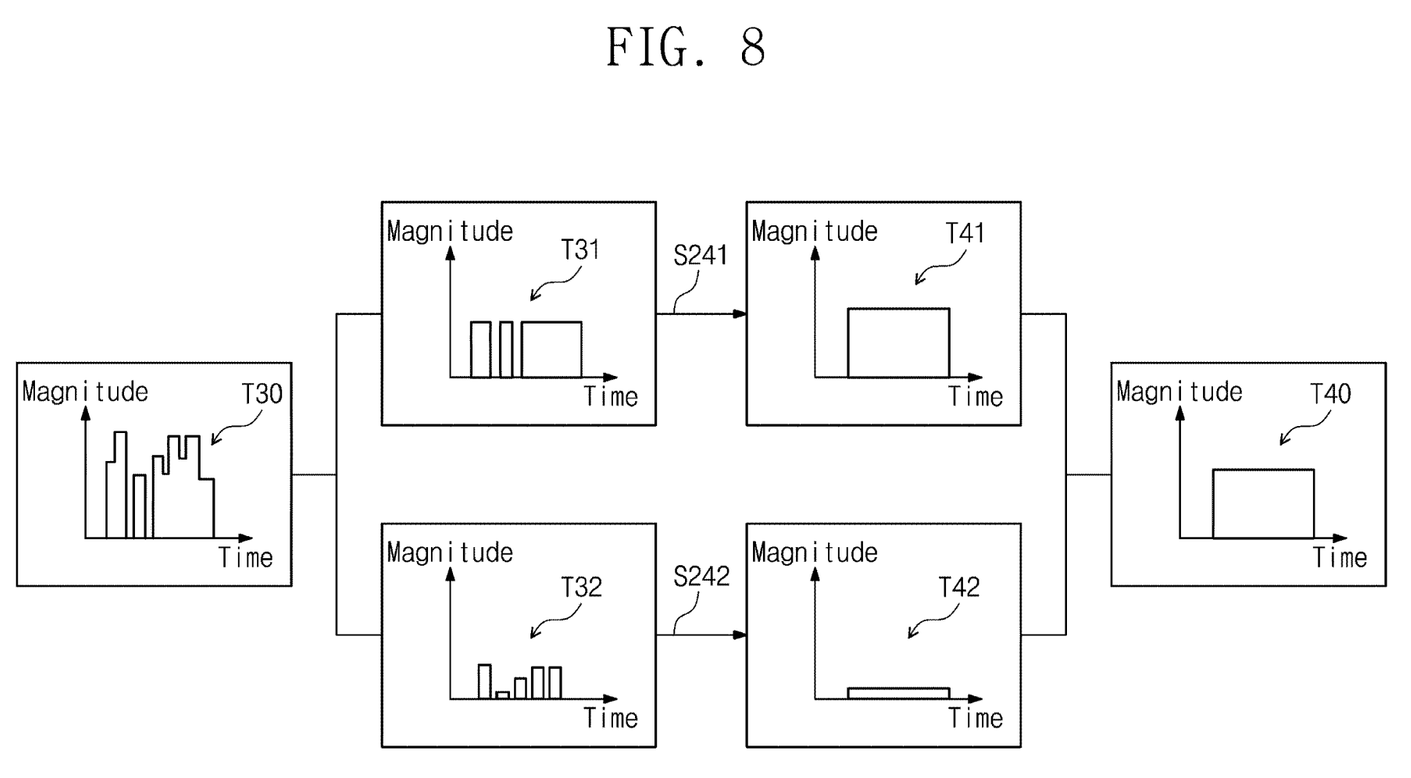
FIG. 8 is a flowchart showing operation S240 of FIG. 7 in more detail.

FIG. 8 is a flowchart showing operation S240 of FIG. 7 in more detail. FIG. 8 will be described with reference to FIGS. 1 and 7.

The output signal T30 may include an effective component T31 and a noise component T32. The effective component T31 may be generated from the molecular vibration of the sample 10 over time. The noise component T32 may be generated from factors other than molecular vibration of the sample 10 over time. In FIG. 8, the effective component T31 and the noise component T32 are separated, but in an embodiment of the inventive concept, the effective component T31 and the noise component T32 may not be separated from the output signal T30.

In operation S241, the decoder 140 may perform the convolution of the orthogonal code OC received from the encoder 110 and the effective component T31 based on the timing synchronized with the encoder 110. The correlation value between the orthogonal code OC and the effective component T31 may be 1. Thus, the effective component T31 may be converted into the decoded effective component T41. Here, the decoded effective component T41 may be in a state corresponding to the optical signal T10 before being modulated or encoded. That is, the effective component T31 may be restored by the orthogonal code OC.

In operation S242, the decoder 140 may perform the convolution of the orthogonal code OC received from the encoder 110 and the noise component T32 based on the timing synchronized with the encoder 110. The noise component T32 and the effective component T31 may be convolved with the same orthogonal code OC. The correlation value of the orthogonal code OC and the noise component T32 may be 0. Thus, the noise component T32 may be converted into a decoded noise component T42. Here, the decoded noise component T42 may be a signal in which the noise is weakened or the noise is partially or completely removed by the orthogonal code OC. As a result, the valid signal T40 may include a decoded effective component T41 and a decoded noise component T42. The SNR of the valid signal T40 may be improved.

Figure 9:
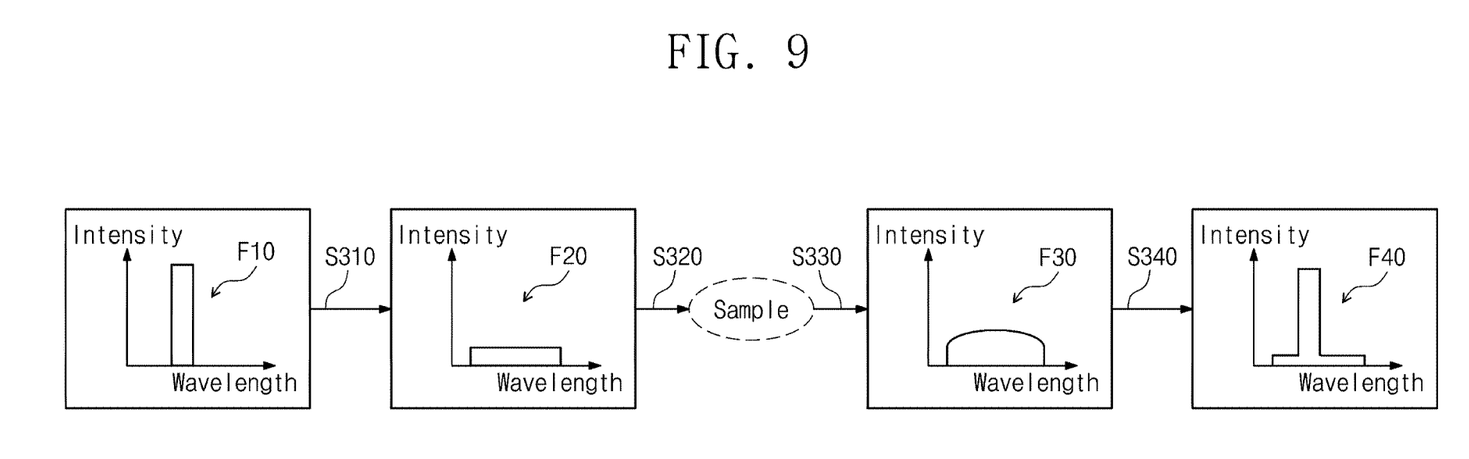
FIG. 9 is a flowchart showing the spectroscopic method of FIG. 6 in more detail in a frequency domain.

FIG. 9 is a flowchart showing the spectroscopic method of FIG. 6 in more detail in a frequency domain. FIG. 9 will be described with reference to FIGS. 2 and 6. Operation S310 may correspond to operation S110 of FIG. 6. Operation S320 may correspond to operation S120 of FIG. 6. Operation S330 may correspond to operation S130 of FIG. 6. Operation S340 may correspond to operation S140 of FIG. 6. Referring to FIG. 9, the continuous wave signal F10, the optical signal F20, the output signal F30, and the valid signal F40 may be expressed by a spectral graph of intensity according to wavelengths.

In operation S310, the light source 120 may encode the continuous wave signal F10 into the optical signal F20. The continuous wave signal F10 may correspond to the continuous wave signal CW of FIG. 6, and the optical signal F20 may correspond to the optical signal ENC of FIG. 6. The encoder 110 may provide an orthogonal code OC that spreads bandwidth to the light source 120. The light source 120 may perform the convolution of the orthogonal code OC and the continuous wave signal F10. By the spectrum-spreading and convolution, the bandwidth of the optical signal F20 may be wider than the bandwidth of the continuous wave signal F10. The light source 120 may generate an optical signal F20 spread by an orthogonal code OC based on the result of the convolution. The energy of the optical signal F20 may be equal to the energy of the continuous wave signal F10.

In operation S320, the light source 120 may provide the optical signal F20 to the sample 10. In operation S330, the detector 130 may detect the output signal F30 from the sample 10. The output signal F30 may correspond to the output signal OUT of FIG. 6. The sample 10 may absorb, scatter, transmit, and reflect the optical signal F20 in all or part of the wavelength region of the optical signal F20. By the optical signal F20, molecular vibration of the sample 10 may occur. A output signal F30 of absorption, scattering, transmission, and the like may be emitted from the sample 10 based on the molecular vibration of the sample 10 with respect to all or part of the wavelength region of the optical signal F20.

In operation 340, the decoder 140 may extract a valid signal F40 from the output signal F30. The valid signal F40 may correspond to the valid signal EFF of FIG. 6. The decoder 140 may perform a convolution of the output signal F30 with the orthogonal code OC received from the encoder 110. By the spectrum-despreading and convolution, the bandwidth of the output signal F30 may be restored. The decoder 140 may obtain a valid signal F40 from the output signal F30 based on the result of the convolution.

Figure 10:
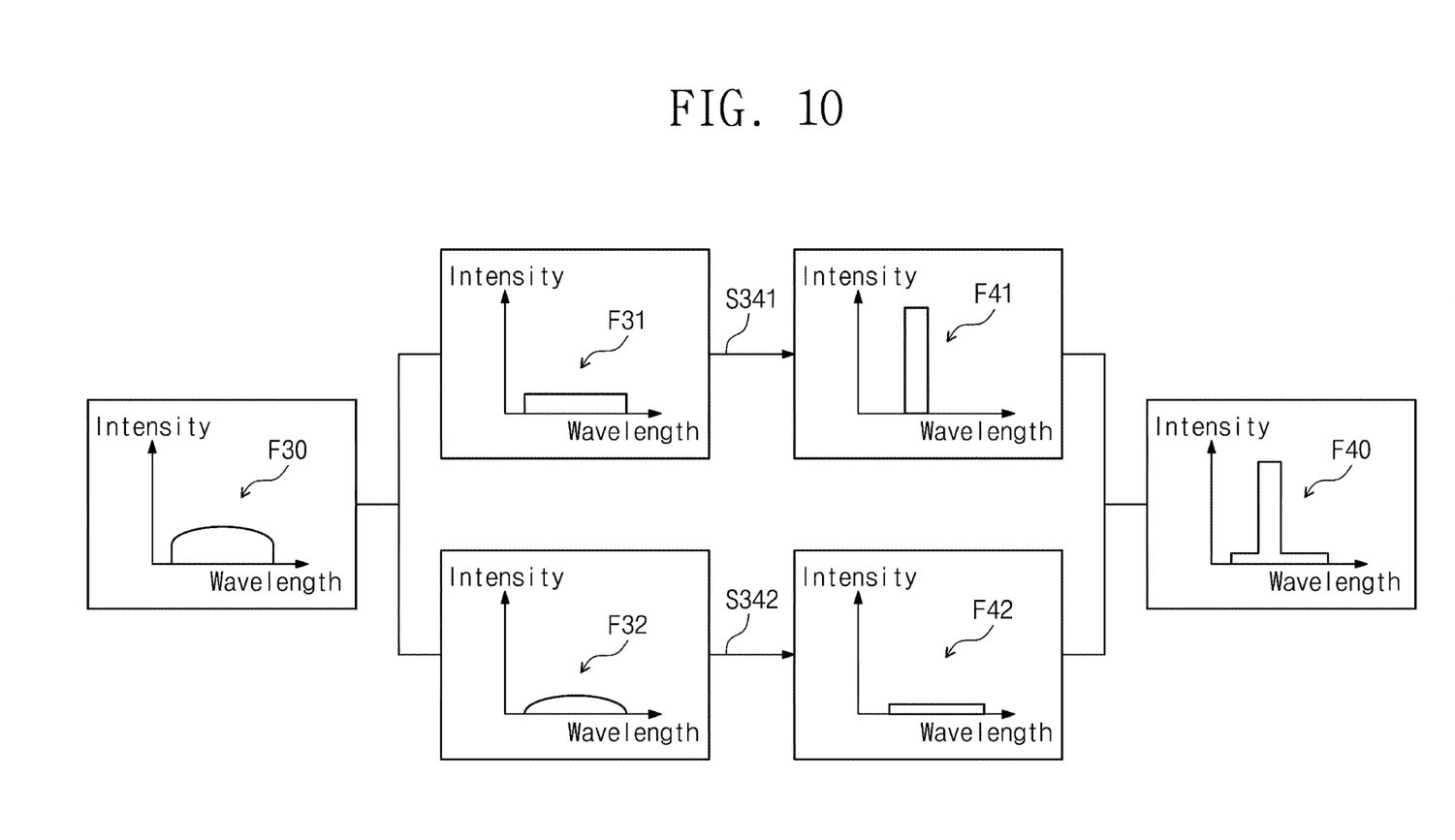
FIG. 10 is a flowchart showing operation S340 of FIG. 9 in more detail.

FIG. 10 is a flowchart showing operation S340 of FIG. 9 in more detail. FIG. 10 will be described with reference to FIGS. 2 and 9.

As in the time domain, the output signal F30 may include an effective component F31 and a noise component F32. The effective component F31 may be generated from the molecular vibration of the sample 10 with respect to all or part of the wavelength region of the optical signal F20. The noise component F32 may be generated from factors other than the molecular vibration of the sample 10 with respect to all or part of the wavelength region of the optical signal F20. In FIG. 10, the effective component F31 and the noise component F32 are separated, but in an embodiment of the inventive concept, the effective component F31 and the noise component F32 may not be separated from the output signal F30.

In operation S341, the decoder 140 may perform the convolution of the orthogonal code OC received from the encoder 110 and the effective component F31. The correlation value of the orthogonal code OC and the effective component F31 may be 1. Thus, the effective component F31 may be converted into the decoded effective component F41. Here, the decoded effective component F41 may be in a state corresponding to the optical signal F10 before being modulated or encoded. That is, the effective component F31 may be restored by the orthogonal code OC.

In operation S342, the decoder 140 may perform the convolution of the orthogonal code OC received from the encoder 110 and the noise component F32 based on the timing synchronized with the encoder 110. The noise component F32 and the effective component F31 may be convolved with the same orthogonal code OC. The correlation value of the orthogonal code OC and the noise component F32 may be 0. Thus, the noise component F32 may be converted into a decoded noise component F42. Here, the decoded noise component F42 may be a signal in which the noise is weakened or the noise is partially or completely removed by the orthogonal code OC. As a result, the valid signal F40 may include a decoded effective component F41 and a decoded noise component F42. The SNR of the valid signal F40 may be improved.

Figure 11:
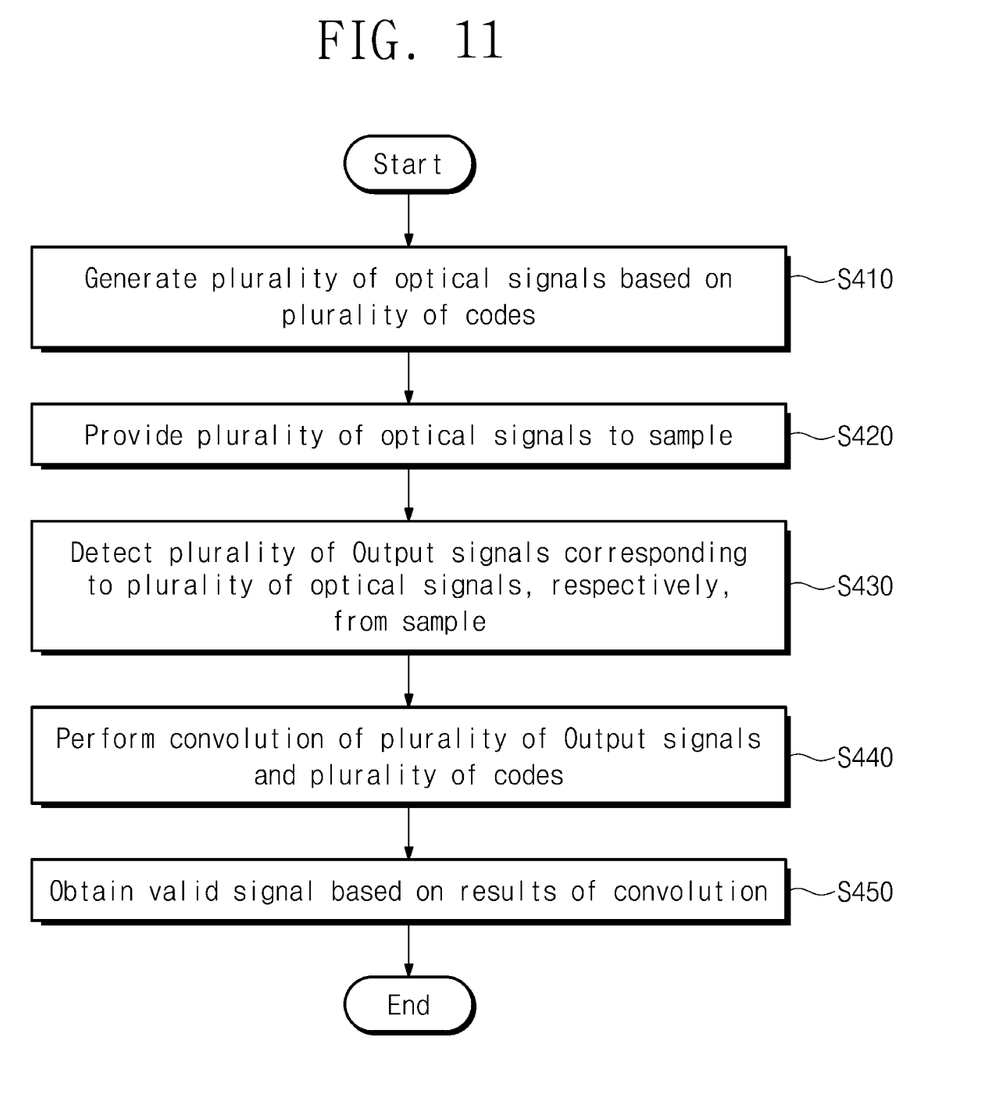
FIG. 11 is a flowchart illustrating a spectroscopic method according to another embodiment of the inventive concept.

FIG. 11 is a flowchart illustrating a spectroscopic method according to another embodiment of the inventive concept. FIG. 11 will be described with reference to FIG. 2.

In operation S410, the light source 120 may generate a plurality of optical signals based on a plurality of orthogonal codes. The code generator 111 may generate a plurality of orthogonal codes. All the plurality of orthogonal codes may be different from each other or may be the same. If the plurality of orthogonal codes are all different from each other, the plurality of orthogonal codes may be orthogonal to each other. That is, the cross-correlation values between a plurality of different orthogonal codes may be 0. The code generator 111 may provide an orthogonal code to each of the plurality of channels included in the light source 120. Each of the plurality of orthogonal codes generated by the code generator 111 may one-to-one correspond to each of the plurality of channels.

In operation S420, the light source 120 may provide a plurality of optical signals, which are generated based on the plurality of orthogonal codes received from the code generator 111, to the sample 10. Each of the plurality of channels may generate an optical signal encoded as a pattern corresponding to the orthogonal code received from the code generator 111. Each of the plurality of channels included in the light source 120 may output an optical signal toward the sample 10. The wavelengths of the plurality of optical signals may be different from each other.

In operation S430, the detector 130 may detect a plurality of output signals that respectively correspond to the plurality of optical signals from the sample 10. A plurality of optical signals output from the light source 120 toward the sample 10 may be absorbed, transmitted, scattered, and reflected by the sample 10. The sample 10 may emit a plurality of output signals based on a plurality of optical signals that are absorbed, transmitted, scattered, and reflected in the sample 10. The plurality of output signals may be deformations of the plurality of optical signals. The detector 130 may simultaneously or sequentially receive a plurality of output signals.

In operation S440, the decoder 140 may perform convolution of a plurality of output signals and a plurality of orthogonal codes. The decoder 140 may perform the convolution of one among a plurality of orthogonal signals and all a plurality of orthogonal codes. Repeatedly, the decoder 140 may perform convolutions for a plurality of orthogonal codes and all the plurality of output signals. Alternatively, the decoder 140 may perform a convolution with only one orthogonal code corresponding to one output signal, with respect to one of the plurality of output signals. The decoder 140 may perform convolutions several times and may perform convolutions simultaneously or sequentially. The decoder 140 may obtain results of convolutions for a plurality of orthogonal codes and a plurality of output signals. Operation S440 will be described in more detail with reference to FIG. 12.

In operation S450, the decoder 140 may obtain a valid signal based on the results of the convolutions. The decoder 140 may obtain a valid signal by summing the results of convolutions for a plurality of orthogonal codes and a plurality of output signals. Operation S450 will be described in more detail with reference to FIG. 12.

Figure 12:
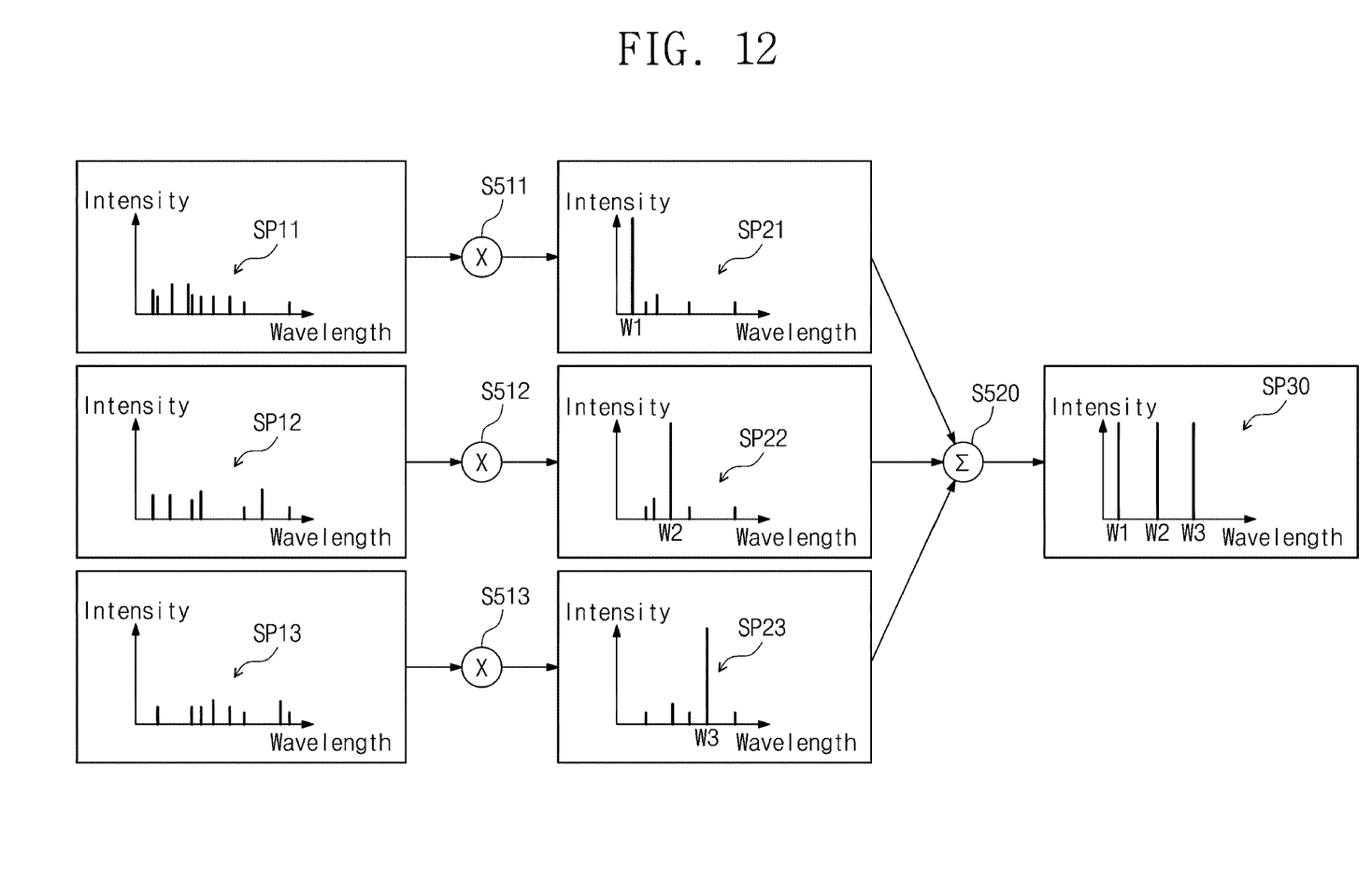
FIG. 12 is a flowchart showing operations S440 and S450 of FIG. 11 in more detail.

FIG. 12 is a flowchart showing operations S440 and S450 of FIG. 11 in more detail. FIG. 12 will be described with reference to FIGS. 2 and 11. In FIG. 12, it is assumed that the light source 120 includes only three channels, that is, the first to third channels 121 to 123. Thus, the light source 120 may provide the first to third optical signals with different wavelengths or different orthogonal codes to the sample 10 based on the first to third orthogonal codes.

The detector 130 may detect the first to third output signals SP11, SP12, SP13 corresponding to the first to third optical signals from the sample 10. The first to third decoded output signals SP21, SP22 and SP23 and the valid signal SP30 are based on the first to third output signals SP11, SP12, and SP13. In FIG. 12, the first to third output signals SP11, SP12, and SP13, the first to third decoded output signals SP21, SP22, SP23, and the valid signal SP30 may be expressed by a spectral graph of an intensity according to wavelengths.

In operations S511 to S513, in order to decode the first to third output signals SP11, SP12, and SP13, the decoder 140 may perform convolutions of the first through third output signals SP11, SP12, SP13 and the first through third orthogonal codes based on the first to third orthogonal codes. In operations S511 to S513, the decoder 140 may perform a convolution with only one orthogonal code corresponding to one output signal, with respect to one of the first to third output signals SP11, SP12, and SP13. For example, the decoder 140 may perform the first convolution of the first output signal SP11 and the first orthogonal code. The decoder 140 may perform the second convolution of the second output signal SP12 and the second orthogonal code. The decoder 140 may perform the third convolution of the third output signal SP13 and the third orthogonal code.

The decoder 140 may generate the first to third decoded output signals SP21, SP22, and SP23 based on the first to third convolutions. Referring to FIG. 12, the intensities of the first to third decoded output signals SP21, SP22, and SP23 may be higher in the first to third wavelengths W1, W2, and W3 than in the other wavelength regions. The first to third wavelengths W1, W2 and W3 may correspond to the wavelengths of the first to third optical signals, respectively. The first to third wavelengths W1, W2 and W3 may be different from each other. It is assumed that the third wavelength W3 is larger than the second wavelength W2 and the second wavelength W2 is larger than the first wavelength W1.

In operation S520, the decoder 140 may obtain a valid signal SP30 by summing the first to third decoded output signals SP21, SP22, and SP23. Referring to FIG. 12, the intensity of the valid signal SP30 may be higher in the first to third wavelengths W1, W2, and W3 than in the other wavelength regions. Since the first to third wavelengths W1, W2, and W3 correspond to the wavelengths of the first to third optical signals, respectively, the valid signal SP30 may be highly reproducible and accurate.

Although a method of modulating a light source optically, electrically, and mechanically with orthogonal code signals is described according to embodiments of the inventive concept, other modulation methods may be used.

A spectroscope according to an embodiment of the inventive concept may effectively remove noise and increase the sensitivity of a valid signal. Also, the resolution of the spectroscope may be increased.

The spectroscopy according to an embodiment of the inventive concept may have a high SNR of a valid signal and a high reproducibility and accuracy of a signal.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A spectroscopic apparatus comprising:
   an encoder configured to output an orthogonal code;
   a light source configured to generate a continuous wave based on the orthogonal code, generate an optical signal encoded as a pattern corresponding to the orthogonal code by modulating an amplitude and phase of the continuous wave based on the orthogonal code, and provide a sample with the optical signal;
   a detector configured to detect an output signal emitted from the sample; and
   a decoder configured to share the orthogonal code with the encoder and extract a valid signal corresponding to the sample based on a correlation between the orthogonal code and the output signal.

2. The spectroscopic apparatus of claim 1, wherein the light source comprises a channel for generating the optical signal.

3. The spectroscopic apparatus of claim 2, wherein the channel comprises:
   a driver configured to generate a driving signal based on the orthogonal code; and optical signal generator configured to receive the driving signal from the driver and generate the optical signal according to the driving signal.

4. The spectroscopic apparatus of claim 2, wherein the channel comprises a continuous wave generator for generating the continuous wave.

5. The spectroscopic apparatus of claim 4, wherein the channel further comprises an optical modulator for generating the optical signal by modulating the amplitude and phase of the continuous wave.

6. The spectroscopic apparatus of claim 4, wherein the channel further comprises:
   at least one slit configured to transmit the continuous wave; and
   a slit controller configured to control opening and closing operations of the at least one slit based on the orthogonal code,
   wherein the continuous wave is modulated into the optical signal by transmitting the at least one slit.

7. The spectroscopic apparatus of claim 1, wherein the encoder comprises a code generator for generating a plurality of orthogonal codes including the orthogonal code that is a first orthogonal code.

8. The spectroscopic apparatus of claim 7, wherein the light source comprises a plurality of channels that respectively correspond to the plurality of orthogonal codes,
   wherein the plurality of channels comprise:
   a first channel configured to generate a first optical signal that is the optical signal having a first wavelength; and
   a second channel configured to generate a second optical signal having a second wavelength different from the first wavelength.

9. The spectroscopic apparatus of claim 1, further comprising:
   a diffraction element configured to diffract the output signal; and a dispersing element configured to disperse the output signal, wherein the diffraction element and the dispersing element are located between the sample and the detector.

10. The spectroscopic apparatus of claim 1, wherein the output signal is generated when all or part of the optical signal is absorbed, scattered, transmitted, or reflected in the sample.

11. The spectroscopic apparatus of claim 1, wherein the orthogonal code is a binary sequence, and a pulse waveform of the optical signal is encoded by line encoding according to the orthogonal code.

12. The spectroscopic apparatus of claim 1, wherein the orthogonal code is one of a pseudo-noise (PN) code and a gold code.

13. A spectroscopic method comprising:

generating a first continuous wave based on a first orthogonal code;

generating a second continuous wave based on a second orthogonal code;

generating a first optical signal encoded according to the first orthogonal code by modulating an amplitude and phase of the first continuous wave; and generating a second optical signal encoded according to the second orthogonal code by modulating an amplitude and phase of the second continuous wave, the second orthogonal code being orthogonal to the first orthogonal code;

providing the first optical signal and the second optical signal to a sample;

detecting a first output signal corresponding to the first optical signal and a second output signal corresponding to the second optical signal from the sample;

decoding the first and second output signals according to the first and second orthogonal codes; and obtaining a valid signal based on the decoded first and second output signals.

14. The method of claim 13, wherein the generating of the first optical signal encoded according to the first orthogonal code and the second optical signal encoded according to the second orthogonal code comprises:

performing a first convolution of the first continuous wave signal and the first orthogonal code; and performing a second convolution of the second continuous wave signal and the second orthogonal code.

15. The method of claim 13, wherein the decoding of the first and second output signals according to the first and second orthogonal codes comprises:

performing a first convolution of the first output signal and the first orthogonal code; and performing a second convolution of the second output signal and the second orthogonal code.

16. The method of claim 15, wherein a wavelength of the first optical signal and a wavelength of the second optical signal are different from each other.

17. The method of claim 16, wherein the obtaining of the valid signal based on the decoded first and second output signals comprises obtaining the valid signal by summing results of the first and second convolutions.

18. A spectroscopic apparatus comprising:

an encoder configured to generate a plurality of orthogonal codes that are orthogoral to each other;

a light source configured to:

generate a plurality of continuous waves based on the plurality of orthogonal codes;

by modulating an amplitude and a phase of each of the plurality of the continuous waves, generate a plurality of optical signals coded based on the plurality of orthogonal codes; and provide the plurality of optical signals to a sample;

a detector configured to detect an output signal from the sample; and a decoder configured to obtain a valid signal based on a correlation between the plurality of orthogonal codes and the output signal.

19. The spectroscopic apparatus of claim 18, wherein the light source comprises a plurality of channels that generate the plurality of optical signals, respectively, wherein each of the plurality of channels comprises:

a continuous wave generator that generates a corresponding continuous wave from among the plurality of continuous wave; and an optical modulator that modulates the amplitude and the phase of each of the plurality of the continuous waves.

20. The spectroscopic apparatus of claim 19, wherein each of the plurality of channels further comprises:

at least one slit configured to transmit the corresponding continuous wave; and a slit controller configured to control opening and closing operations of the at least one slit based on a corresponding orthogonal code from among the plurality of orthogonal codes, wherein the plurality of continuous waves are modulated into the plurality of optical signals, respectively.

* * * * *